July 29, 1941. S. F. COLE 2,250,467

SYRINGE

Filed Feb. 8, 1939

Inventor

Samuel F. Cole.

Patented July 29, 1941

2,250,467

UNITED STATES PATENT OFFICE 2,250,467

SYRINGE

Samuel F. Cole, Bethesda, Md.

Application February 8, 1939, Serial No. 255,341

10 Claims. (Cl. 128—218)

This invention relates to syringes and comprises an improvement in the device disclosed in my prior Patent No. 2,129,675, issued September 13, 1938.

The objects of the present invention are: to provide an improved instrument of the syringe type which is well adapted for either the administration, transfer, or measurement of liquid substances with unusual accuracy; to provide an instrument of the above character in which the micrometer adjustment means is immediately operative regardless of the position of the piston; to provide an instrument of the above character in which the micrometer adjustment means of relatively restricted range is operative over a scale of long range; and to provide an instrument of the above character in which the micrometer adjustment means does not obscure the graduations on the barrel. Other objects will become apparent upon the following disclosure of my invention.

In the drawing, wherein similar reference characters denote corresponding parts throughout the several views.

The present invention provides optionally effective means to releasably couple the micrometer adjustment means to the piston whereby the micrometer adjustment becomes immediately operative without preliminary adjustment with reference to the piston. This design permits the employment of the conventional reciprocal stroke of the piston for obtaining approximate measurements, supplemented by a rotatory stroke for obtaining the accuracy of micrometer adjustment. Unlike my prior invention, this invention provides an instrument in which an unobstructed view of the graduations on the barrel may be had at all times. While this invention comprises a micrometer-syringe, it is also especially adapted for use as a syringe-pipette, and as a syringe-burette. When thus employed in micro-chemical titrations, for example, this invention permits the rapid initial discharge of a reagent, followed by the relatively slow micrometer controlled discharge which permits an accurate determination of the "end point." Obviously, numerous modifications are feasible to adapt this invention to specific purposes, and the range of adjustment may be varied to suit. However, the embodiments illustrated disclose instruments wherein the range of micrometer adjustment is presumed to equal the space above the top graduation of the scale on the barrel, said space being substantially less than the length of the scale.

Figure 1:
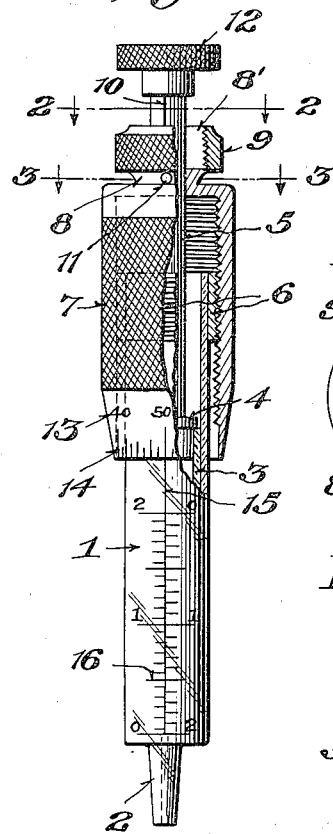
Figure 1 is a front elevation partly in section.
Figure 2:
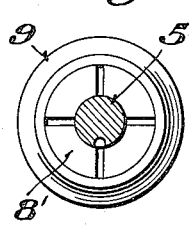
Figure 2 is a cross-section view on line 2—2.
Figure 3:
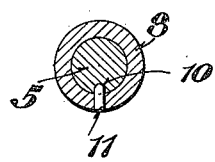
Figure 3 is a cross-section view on line 3—3.

Referring now to Figures 1, 2 and 3, the numeral 1 denotes a transparent barrel terminating at its lower end in the conventional discharge nipple 2, which is adapted to support a hypodermic needle or other suitable discharge members. The tubular piston 3 is ground to a sliding fit in the bore of barrel 1. Upon the upper end of piston 3 is attached the ferrule 4 to which is attached the lower end of the piston-rod 5. Mounted on the upper end of barrel 1 is the exteriorly threaded collar 6 which is in engagement with the interiorly threaded cylindrical sleeve 7. The upper end of sleeve 7 is provided with the exteriorly threaded tubular extension 8 through the bore of which piston-rod 5 is reciprocally movable. Tubular extension 8 is longitudinally slit to form multiple jaws 8', as illustrated in Figure 2. The jaws 8' are forced into frictional contact with piston-rod 5 by means of the knurled closing member 9, which is in threaded engagement with extension 8. Obviously, member 9 cooperates with extension 8 to form a chuck by means of which sleeve 7 is adapted for rapid attachment to piston-rod 5, and thereby to piston 1, regardless of the relative positions of the sleeve and the piston. Piston-rod 5 may be provided with the longitudinal groove or keyway 10 (see Figure 3), which is slidably engaged by the key 11, said key being attached to the lower portion of the tubular extension 8. The function of this key is to relieve the chuck of strain incidental to the rotation of the plunger by the sleeve, especially when employing a piston-rod of small diameter. The piston-rod is also provided with the detachable finger-rest 12. Sleeve 7 is appropriately knurled to facilitate its rotation, and is formed with the beveled lower end 13.

The beveled end 13 of sleeve 7 is graduated with the circumferentially disposed scale 14 which is readable with reference to the longitudinally disposed index-line 15 inscribed on barrel 1. Barrel 1 is also inscribed with scale 16, the graduations of which are preferably alternated as shown in Figure 1 to facilitate the indication of small quantities without the inherent disadvantages of fine graduations. It will be noted that index-line 15 extends above the top graduation of scale 16. This provides registration means for scale 14 over the range of micrometer adjustment. In practice, index-line 15 need be no longer than the effective range of sleeve 7, which, in the embodiments illustrated, is above scale 16. In practice also, the length of sleeve 7 need only equal the combined lengths of bevel 13, collar 6, and the range of micrometer adjustment as indicated by the distance between the top graduation of scale 16 and the periphery of sleeve 7.

The operation of the above described device is as follows:

With the jaws 8' disengaged from piston-rod 5, and with scale 14 preferably indicating zero with reference to index-line 15, the instrument is charged in the manner of conventional syringes. The contents of the barrel may then be discharged by first depressing the piston to eject somewhat less than the desired total volume. Member 9 is then adjusted to force jaws 8' into frictional contact with piston-rod 5, whereupon sleeve 7 is rotated to further depress the piston until the desired volume has been expelled from the instrument.

When this instrument is employed for removing precisely measured volumes, sleeve 7 is first adjusted to its lowermost position with jaws 8' disengaged. Piston 3 is then drawn outwardly until barrel 1 is charged with liquid to within the range of micrometer adjustment, whereupon jaws 8' are clamped upon the piston-rod, and the operation of measuring completed by rotating sleeve 7 to lift the piston. When thus employed, consideration must be given to the liquid contained within the bore of nipple 2 and the needle or tip associated therewith, unless the device has been calibrated to receive a definite volume.

Figure 4:
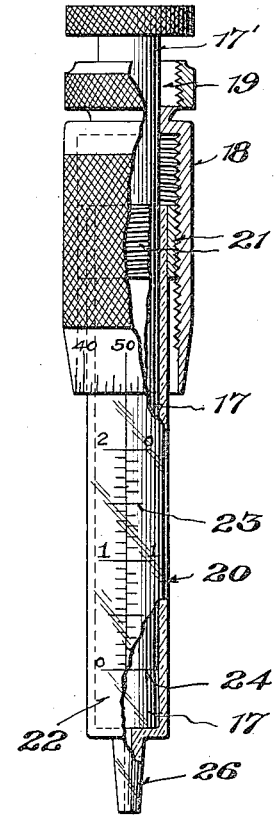
Figure 4 is a front elevation, partly in section, of a modification of Figure 1.

Figure 4 illustrates a modification of the foregoing embodiment which differs therefrom in that the piston is of uniform diameter to permit its withdrawal from the instrument to facilitate cleaning.

The piston in this modification may be composed of the upper portion 17', of metal or suitable plastic material, securely attached to the tubular glass lower portion 17. The graduated sleeve 18 is provided with the chuck jaws 19 which correspond to jaws 8'. The barrel 20 is provided with the exteriorly threaded collar 21, and is elongated to provide the space 22 below scale 23. This space provides means for supporting the instrument without obstructing the graduations of scale 23. Obviously, piston 17 is lengthened to correspond with the length of barrel 20. Piston 17 is also inscribed with the circumferentially disposed line or groove 24, which is utilized for reading scale 23, in lieu of the periphery of the piston. Line 24 is obviously in exact registration with the lower graduation of scale 23 when the piston is fully depressed.

The operation of this modification differs from the first described embodiment only in that scale 23 is readable with reference to line 24, instead of in the conventional manner by reference to the periphery of the piston, and in that piston 17 may be entirely withdrawn from the instrument without dismantling.

Figure 5:
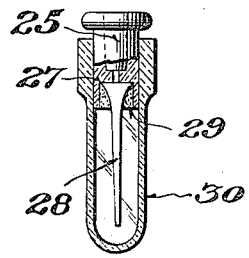
Figure 5 is a front elevation, partly in section, of a discharge tip assembly.

When employed as a pipette or a burette, especially with liquids which react with metal, a discharge tip of glass, quartz, or other inert material is used. Figure 5 illustrates a tip assembly of this character. In this figure, the numeral 25 denotes a cored hub, of glass or suitable plastic material, which is adapted for attachment to the discharge nipple of the instrument (nipple 2 or 26). The hub 25 is formed with the seat 27 in which the tip 28 is confined by means of the retaining means 29. This means may either comprise a suitable cement, or a flexible bushing. The latter would tend to protect the tip by its cushioning effect. The tip 28 is protected, when not in use, by the detachable cover 30, which may be either of glass or plastic material.

Various modifications and embodiments of this invention are feasible, and all such variants and adaptations are to be construed as within the scope of my invention if consistent with the appended claims.

Having thus described my invention, I claim:

1. A device of the character described comprising in combination a graduated barrel an index line inscribed on the barrel, a graduated tubular member adjustably mounted on the barrel a piston mounted within the barrel and slidably adjustable through the tubular member, and clamping means for releasably coupling the tubular member to the piston for simultaneously adjusting the piston and the tubular member in relation to the indicia on the barrel, the said clamping means being optionally effective regardless of the relative positions of the cooperant members.

2. A device of the character described comprising in combination a graduated barrel, a piston reciprocally mounted within the barrel and registerable with the graduations thereon for coarse adjustment, supplementary indicia inscribed on the barrel above the graduations thereon, a graduated threaded member in engagement with the barrel and registerable with the supplementary indicia for fine adjustment, and clamping means for releasably connecting the piston to the threaded member for rotating said connected members to position the piston in accordance with the fine adjustment, the piston being slidably adjustable through the tubular member.

3. A device of the character described comprising in combination a graduated barrel an index line inscribed on the barrel supplementary to the graduations thereon, a graduated tubular member in threaded engagement with the barrel, a piston mounted within the barrel and registerable with the graduations on the barrel for primary measurements, a piston-rod attached to the piston and slidably adjustable through the tubular member, means to prevent the rotation of the piston rod within the tubular member, a graduated tubular member in threaded engagement with the barrel, and an optionally effective clamping means for coupling the tubular member to the piston-rod for simultaneously rotating the piston and the tubular member relative to the index line to effect secondary measurements.

4. A device of the character described comprising in combination a graduated barrel, a piston reciprocally mounted within the barrel, a piston-rod attached to the piston, a keyway in the piston-rod, a graduated tubular member in threaded engagement with the barrel, a key supported by the tubular member in sliding engagement with the keyway, and a chuck supported by the tubular member to releasably couple the tubular member to the piston-rod.

5. A device of the character described comprising in combination a graduated barrel, a piston reciprocally mounted within the barrel, an index-line inscribed on the barrel above the graduations thereon, a graduated sleeve in threaded engagement with the barrel and rotatably adjustable relative to the index-line to subdivide the graduations on the barrel, the piston being slidably adjustable relative to the sleeve for registration with the graduations on the barrel, a chuck for attaching the sleeve to the piston for adjusting the latter proportionally to the adjustment of the sleeve, and means to limit the rotation of the piston.

6. A device of the character described comprising in combination a syringe barrel inscribed with graduations indicative of primary measurements, a piston extending through the tubular member and registerable with the graduations on the barrel, a tubular member rotatably adjustable on the barrel and having graduations indicative of secondary measurements, a chuck for releasably coupling the tubular member to the piston to secure the latter against longitudinal movement, an index-line inscribed on the barrel above the graduations thereon, the piston being reciprocally adjustable relative to the graduations on the barrel for primary measurements, and rotatably adjustable by means of the tubular member for secondary measurements.

7. A device of the character described comprising in combination a syringe barrel having a graduated measuring portion for primary measurements and a relatively short measuring portion without graduations above the graduated portion for secondary measurements, an index line inscribed on the short measuring portion of the barrel, a piston mounted within the barrel and registerable with the graduations thereon, a graduated tubular member rotatably mounted on the barrel and adapted for registration with the index line, a piston slidably mounted within the barrel and the tubular member, and a chuck integral with the tubular member adapted to clamp said tubular member to the piston for simultaneously rotating the piston and the tubular member to apply the secondary measurements over the range of the primary measurements adjustment.

8. A device of the character described comprising in combination a graduated barrel, a threaded collar attached to the barrel, a graduated tubular member in threaded engagement with the barrel, a piston of uniform diameter mounted within the barrel and extending beyond the tubular member, the graduations on the barrel being positioned substantially above the lower end thereof, a circumferential indicating mark on the piston in alinement with the bottom graduation on the barrel, an index-line inscribed on the barrel above the graduations thereon, the indicating mark being registerable with the graduations on the barrel for coarse measurement, the graduations on the tubular member being registerable with the index-line to subdivide the graduations on the barrel, resilient jaws integral with the tubular member, and means for closing the jaws on the piston to operate the piston in response to the rotation of the tubular member.

9. A device of the character described comprising in combination a syringe barrel having its lower portion inscribed with a scale and having a relatively short portion above the scale inscribed with an index line, a graduated tubular member in threaded engagement with the barrel, a piston of uniform diameter reciprocally mounted within the barrel and adapted for withdrawal through the tubular member, and a clutch on the tubular member to releasably connect the tubular member to the plunger, the graduations of the tubular member being readable relative to the index line to subdivide the graduations of the scale, the scale being readable with reference to the piston.

10. A device of the character described comprising in combination a syringe barrel provided with an upper and a lower measuring portion, the upper portion being inscribed with an index line and the relatively long lower portion being inscribed with a scale, a graduated micrometer adjustment means in threaded engagement with the barrel and limited in adjustment to said upper portion of the barrel, a piston slidably adjustable within the barrel and the micrometer adjustment means, the piston being registerable with the graduations of the scale and the micrometer adjustment means being registerable with the index line to subdivide the graduations of the scale, a clamping means attached to the micrometer adjustment means and adapted to releasably connect the piston to the micrometer adjustment means, and a detachable capillary discharge tip resiliently mounted in a hub member.

SAMUEL F. COLE.